United States Patent [19]

Gipson

[11] Patent Number: 5,544,987

[45] Date of Patent: Aug. 13, 1996

[54] REMOVAL TOOL FOR BROKEN OR SEIZED INNER BUDD NUTS

[76] Inventor: Gregory L. Gipson, 4748 N. 28th Dr., Phoenix, Ariz. 85017

[21] Appl. No.: 272,938

[22] Filed: Jul. 11, 1994

[51] Int. Cl.⁶ .................................................. B23B 45/14
[52] U.S. Cl. .......................... 408/72 R; 29/802; 81/53.2; 408/84; 408/102; 408/111; 408/115 R; 408/204
[58] Field of Search .............................. 408/72 R, 72 B, 408/79, 80, 84, 115 R, 115 B, 99–102, 110–112, 204, 87; 29/802; 81/53.2; 408/99–102, 110–112, 204, 87

[56] References Cited

U.S. PATENT DOCUMENTS

| | | | |
|---|---|---|---|
| 3,913,427 | 10/1975 | Brase | 81/53.2 |
| 4,616,965 | 10/1986 | Anderson et al. | 408/204 |
| 4,714,386 | 12/1987 | Phillips | 408/115 R |
| 4,759,666 | 7/1988 | Grab | 408/84 |
| 4,781,082 | 11/1988 | Swertz | 81/53.2 |
| 4,940,370 | 7/1990 | Gipson | 81/53.2 |

*Primary Examiner*—Steven C. Bishop
*Attorney, Agent, or Firm*—Gregory J. Nelson

[57] ABSTRACT

A tool for removing broken threaded fasteners such as seized or damaged Budd nuts mounted on a stud extending from the hub of a dual wheel assembly. The tool includes a base plate which is securable at the Budd nuts adjacent the broken nut by stand-off and fasteners. A cutter is advanceable by a pivotal bar by means of a manually operable adjustment knob. The cutter is rotatable in a busing and has a cutting head with a bore which extends over the damaged nut. Replaceable cutting teeth are carried on the cutting head and when advanced cut through the flange on the damaged Budd nut. The device can be powered by a power tool attachable to the device. A depth guide is provided to assist the mechanic in correctly determining the proper depth of cut. As the cutting head is advanced, the flange portion of the Budd nut is cut away so the inner wheel rim can be removed from the hub and thereafter the remaining shaved Budd nut can be easily removed.

16 Claims, 3 Drawing Sheets

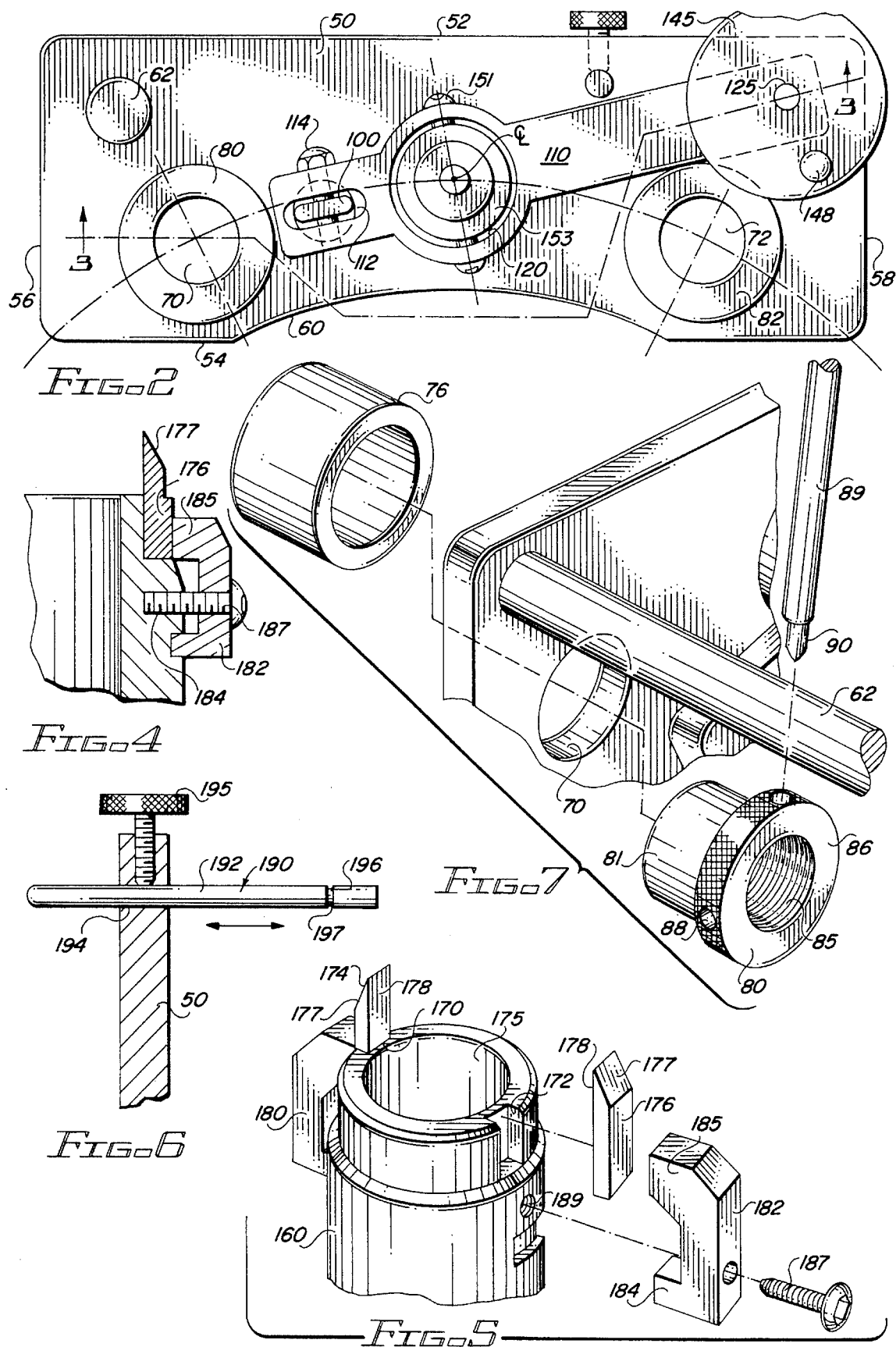

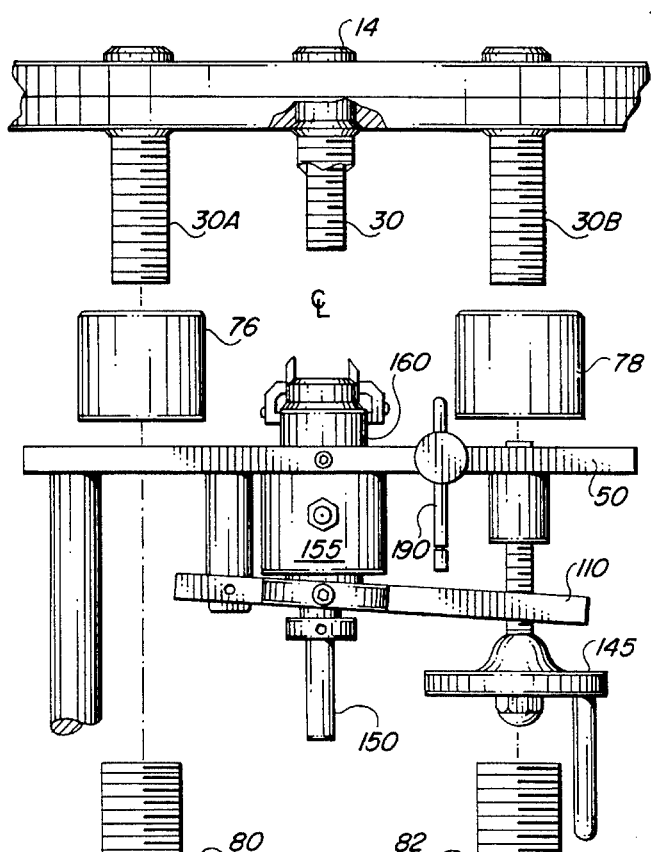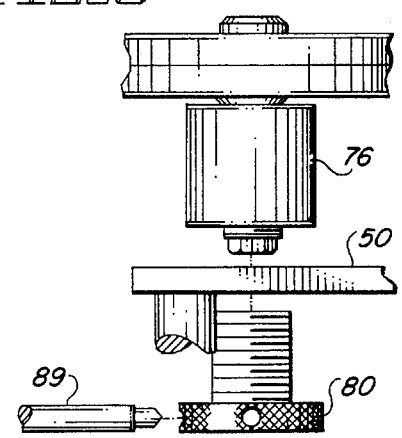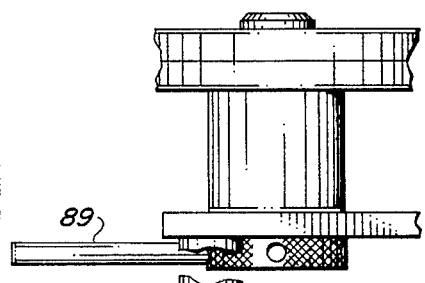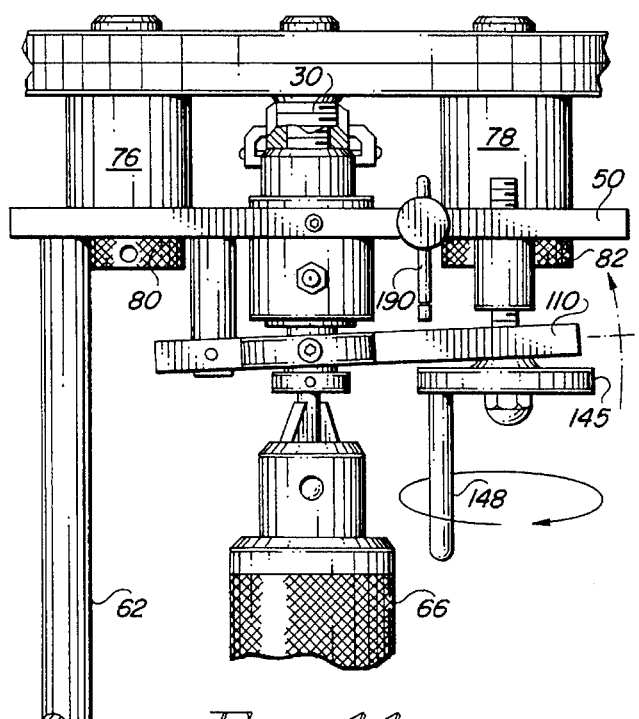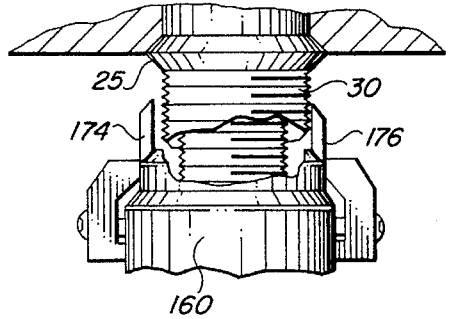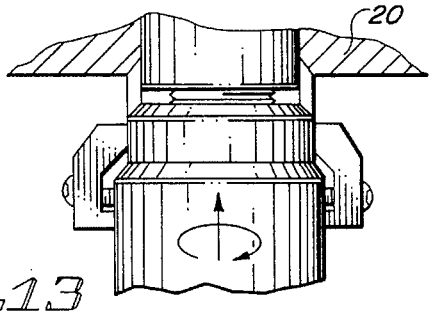

REMOVAL TOOL FOR BROKEN OR SEIZED INNER BUDD NUTS

FIELD OF THE INVENTION

The present invention relates to a tool for removing threaded fasteners and more particularly relates to a cutting tool for removing damaged or seized Budd nuts from a wheel such as a truck wheel.

Vehicles such as large trucks conventionally have dual wheel assemblies which are secured in place by circumferentially arranged nuts termed "Budd nuts" which are threaded on studs which extend from the brake drum or axle hub. The studs extend through registered openings in the inner dual wheel rim. The inner end of each of the nuts has an enlarged beveled collar which engages a chamfered surface at the hole or bore in the inner wheel and, when tightened, the collar secures the inner wheel in position. The Budd nut has an outer end provided with flattened faces which facilitate engagement by an appropriate tool such as a wrench for removal of the nuts. The nut extends through matching bores in the outer wheel rim and the outer wheel is held in place by hex nuts in threaded engagement with the outside of the Budd nut.

When it is necessary to remove the inner wheel, the hex nuts that retain the outer wheel rim and are removed from the Budd nut and the outer truck wheel may then be removed. However, in many instances, attempts to remove the inner wheel during repair or replacement may result in the end of the Budd nut being rounded off or broken. This usually occurs because the Budd nut has become rusted and is frozen to the stud on which it is mounted or seized to the chamfered surface of the inner wheel. The Budd nuts are often broken or damaged due to excessive torque applied by an impact wrench or similar tool. In such cases, removal of the broken nut becomes a laborious and difficult task.

Conventional procedures for removing a broken Budd nut generally involves cutting the nut away. If the Budd nut is broken close to its inner end, removal of the nut in this manner is often difficult as there is not enough exposed material to obtain purchase with a gripping tool. In such a case, the mechanic must often resort to use of a chisel or cutting torch in attempts to remove the broken nut which may cause damage to the inner studs and to the wheel. Further, use of a chisel or torch to cut away the lug requires a substantial amount of mechanic's time which is costly and which also results in loss of valuable truck road time.

Accordingly, there exists a need for a reliable, convenient tool for quickly removing the remaining portion of a broken Budd nut from wheel studs.

DESCRIPTION OF THE RELATED ART

Several devices for this purpose can be found in the prior art. One such prior art tool incorporates a plate-mounted cutter. The plate has holes which register with the stud-mounted nut adjacent the broken nut. The cutting portion of the device registers with the broken nut. The cutter is then manually operated by a ratchet tool to sever the flared portion of the Budd nut from the inner stud. One such tool of this type is sold under the designation "Budd Nut Cutter".

Another prior art tool for removing broken threaded fasteners is shown in U.S. Pat. No. 3,913,427. This patent describes a tool for removing broken threaded fasteners which tool has an open-ended gripping member which has a recess with an interior wall having ridges which grip the fastener when driven onto the fastener. The gripping member is fixed at one end of a threaded shaft and extends to the end wall of a sleeve and is attached at the other end to a flat-sided head. A movable nut is threaded onto the shaft between the sleeve and the head for removing the gripping member from the broken fastener after it has been loosened.

U.S. Pat. No. 4,781,082 discloses a broken stud and nut remover. This patent shows a two-piece kit for removal of a damaged wheel lug stud and includes a nut having a splined aperture and a drive-on tool. The drive-on tool has a recess in one end for loosely accepting the nut when the nut is placed in the recess. When the nut is driven on the lug, the interior edges of the nut grip the lug stud so the nut may thereafter be twisted by a gripping member.

One particularly effective tool for this purpose is shown in my prior U.S. Pat. No. 4,940,370. This patent shows a tool for removing broken threaded fasteners such as a seized or damaged Budd nuts of a dual wheel assembly. The tool includes a pilot member having a generally cylindrical exterior surface which defines an axially extending threaded bore engageable with the stud extending through the broken Budd nut. A cutter member has a body defining a guided bore which is engageable about the exterior of the pilot member and is rotatable by a power tool. When the cutter member is advanced at least the flange portion of the Budd nut is cut away so that the inner wheel rim can be removed from the hub and thereafter the remaining shaved nut can be removed.

While prior art devices, particularly the prior art device shown in U.S. Pat. No. 4,940,370, are to some extent effective for removing broken nuts, there are instances where removal of broken Budd nuts would be facilitated by a secure device which allows the user to easily and efficiently cut-away the projecting collar or flange of the nut at a controlled rate so that the wheel rim may be removed exposing the remaining inner portion of the nut so that it can be gripped and removed by an appropriate tool.

SUMMARY OF THE INVENTION

The above objects and advantages of the invention are accomplished by a tool which is engageable at the Budd nuts oppositely adjacent a broken nut. The tool includes a plate which is positioned above the surface of the inner wheel by cylindrical stand-offs inserted over the adjacent nuts. The plate is secured in place by a pair of nuts which threadably engage the oppositely adjacent Budd nuts through the stand-offs. The nuts have either right-handed thread or left-handed thread depending on the side of the truck on which the tool is to be mounted.

The cutting tool has a body within a bushing, such as a bronze bushing, and is mounted on a plate which is securable at the Budd nuts oppositely adjacent the damaged nut. The cutting tool inchdes a shank which, through a throw-out bearing, drives a cylindrical cutter head. The bearing is reciprocable within a pivot bar. The cutter body fits over the damaged nut. The exterior of the cutter body carries replaceable cutting teeth which are axially aligned with the collar on the inner end of the broken Budd nut. The cutting tool is rotated by a suitable power tool such as a drill securable at the shank of the cutting tool and is advanced by an adjusting knob which positions the pivot bar so that the teeth are advanced at a controlled rate to cut the collar of the Budd nut away. Once the collar has been cut away, the cutting tool is backed off and the nuts are loosened and the tool and stand-offs can then be removed. The device includes a depth gauge in the form of a pin with suitable indicia which is set by the user so that the depth of the cut is gauged so as not to cut into or unnecessarily damage the inner wheel.

Once the tool has been removed after the collar on the damaged Budd nut has been cut away, the inner wheel may be removed and the remaining portion of the nut can be removed by a hand tool or by application of torque with a suitable gripping tool.

Accordingly, the loosening or removal of a difficult-to-remove, seized fastener can be performed quickly and with minimum effort even by a relatively unskilled mechanic. The tool of the present invention allows the mechanic to easily control the feed rate of the cutter tool. The tool, which is mounted on stand-offs at adjacent nuts, provides stable and axially aligned positioning of the cutting tool.

BRIEF DESCRIPTION OF THE DRAWINGS

The above objects, advantages and features of the present invention will become more apparent from the following detailed description taken in conjunction with the accompanying drawings in which:

FIG. 2 is an elevational view of the tool in a mounted position as shown in FIG. 1 without the power tool attached;

FIG. 4 is an enlarged detail view of the head of the cutter tool as indicated in the encircled area 4 in FIG. 3;

FIG. 5 is an exploded perspective view of the cutter head;

FIG. 6 is a detail view showing the adjustable depth gauge;

FIG. 7 is a partial perspective, exploded view showing a stand-off nut and portion of the tool base plate;

FIG. 8 is a top view illustrating the attachment of the tool to a wheel;

FIG. 9 is a top view of a stand-off, mounting plate, nut and handle;

FIG. 10 is a view similar to FIG. 9 showing the nut tightened in position against the mounting plate;

FIG. 11 is a top view of the cutter tool showing it in a position of use;

FIG. 12 is a detail view of the broken Budd nut and a portion of the cutting tool; and FIG. 13 is a view similar to FIG. 12 showing the cutting tool advanced to a position in which the collar of the Budd nut has been cut away.

Figure 1:
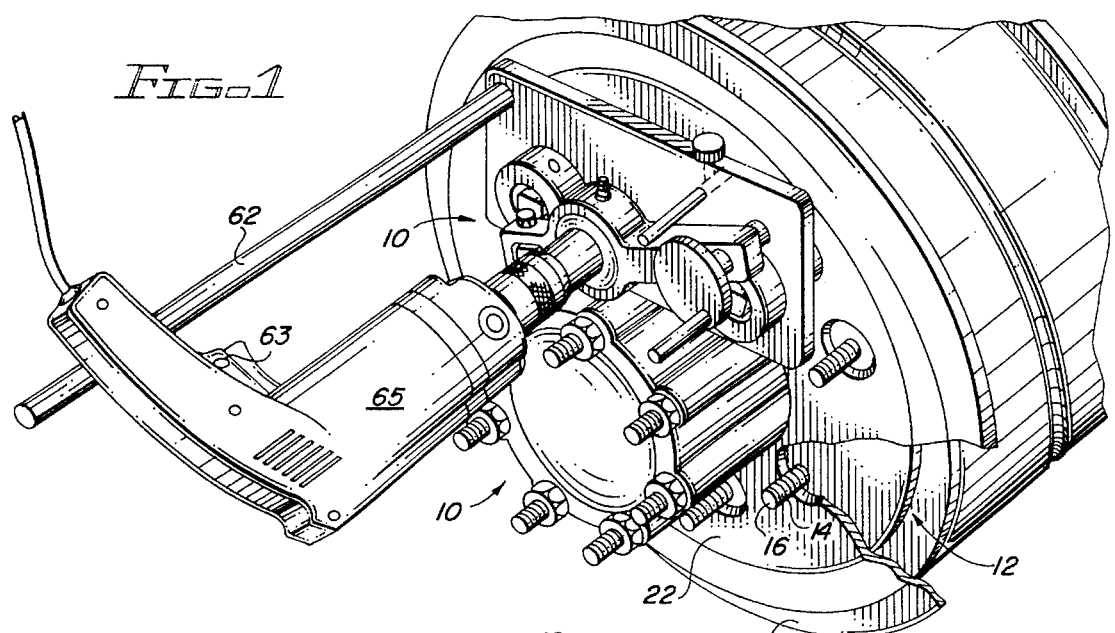
FIG. 1 is a perspective view of a typical truck hub and inner wheel with projecting lugs showing the tool of the present invention secured to the hub in an operative position.
Figure 3:
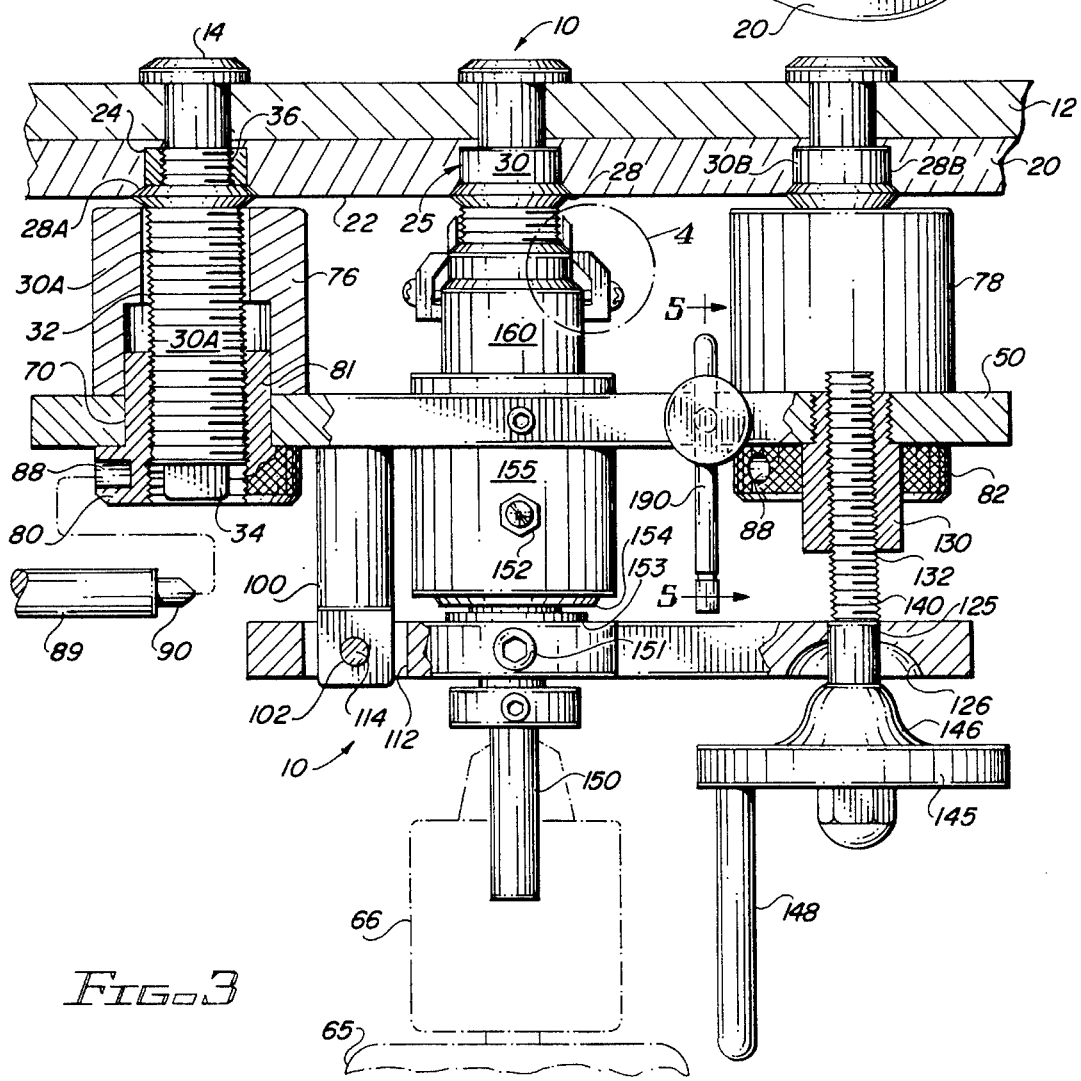
FIG. 3 is a sectional view taken along irregular section line 3—3 of FIG. 2.

Referring now to the drawing, particularly FIGS. 1 to 3, the tool of the present invention is generally designated by the numeral 10 and attached to a conventional dual wheel axle and hub assembly. The assembly includes an inner hub 12 having a plurality of circumferentially arranged studs 14 extending outwardly from the hub. The studs are externally threaded at 16. The inner dual wheel rim 20 carries a pneumatic tire, not shown. Rim 20 has a mounting surface 22 which defines a plurality of circumferentially arranged bores 24 which register with the studs 14 and are somewhat larger in diameter than the external diameter of the studs. The bores each have a tapered or chamfered outer edge 25 which complimentarily receives the tapered collar or flange 28 on the inner end of a Budd nut 30, 30A, 30B which holds the wheel rim in place. Each nut has a shank or body which is externally threaded at 32 having an outer end with flattened faces 34 which are adapted to receive a wrench or similar tool. The nuts are internally threaded as indicated at 36 and are threaded on the shank or body of the studs.

The outer wheel rim is not shown but has a plurality of mounting holes which register with the inner nuts and are held in place by hex nuts. The inner wheel rim is accordingly secured to the wheel hub and held in place by the inner collar on the nuts. The outer wheel rim is mounted on the inner nuts and held in place by the hex nuts, not shown.

The Budd nuts can become damaged or seized and it is not uncommon for the nut to break off when the nut is tightened or when attempts are made to remove the lug with an impact wrench or other torquing tool. Often the Budd nut will break away close to the surface of the inner wheel leaving insufficient length of the nut remaining so that it cannot be gripped by a tool. Accordingly, the tool of the present invention facilitates removal of the broken Budd nut quickly and conveniently.

The tool 10 of the present invention is adapted to be secured to the Budd nuts 30A and 30B oppositely adjacent the broken nut 30 providing a stable mounting for the cutting tool. Accordingly, the tool of the present invention includes a plate 50 having opposite sides 52, 54 and opposite edges 56, 58. The edge 54 may include an arcuate recess 60 so that the plate 50, when in a use position, will clear the central hub of the wheel assembly. A stop bar 62 extends from the upper surface of the plate adjacent edge 56 and serves to engage the handle of a power tool such as a drill 65 which is securable to the tool shank 150 at conventional chuck 66. When the tool is in use, the stop bar 62 will resist torquing or twisting of the power tool 65 as shown in FIG. 1. Use of the stop bar 62 is a convenience which will free one of the hands of the mechanic so that the mechanic may apply lubricating oil to the cutting teeth.

Plate 50 defines a pair of spaced apart bores 70 and 72. The bores are of a diameter larger than the exterior diameter of conventional Budd nut. The bores 70, 72 are radially and angularly displaced at a location corresponding to the location of the nuts on either side of a broken Budd nut. For example, if the location indicated by the "CL" in FIG. 2 is the center of the axis of a broken nut 30, bores 70 and 72 are axially aligned with the axis of the nuts 30A, 30B immediately oppositely adjacent the nut 30.

In a use position, the plate 50 is supported at a distance elevated or spaced from the surface of the inner wheel by a pair of stand-offs 76 and 78. The stand-offs 76, 78 are cylindrical members which can be fit loosely over the nuts adjacent the broken nut. Plate 50 is then held in place by a pair of retaining nuts 80, 82. The retaining nuts 80, 82 each have a cylindrical body 81. Retaining nut 80 is inserted within bore 70 and retaining nut 82 is inserted within bore 72. A slight clearance exists between the exterior of the body 81 of the nuts and the respective bores 70, 72 to allow proper positioning and alignment of the tool with the broken Budd nut.

The interior diameters of the retaining nuts 80, 82 are threaded at 85. The nuts are designated right hand or left hand threads depending upon the side of the truck on which the wheel under repair is located. The nuts have a circumferential flange 86 which is provided with a plurality of radially extending bores 88. A tightening tool 89, as seen in FIGS. 3 and 7, has a tip 90 insertable in the bores 88 to allow the mechanic to manually tighten the nuts in place on the adjacent Budd nuts.

Securement of the plate 50 to the wheel assembly at the adjacent nuts provides a stable and properly aligned support for the cutting tool. The cutting tool includes a pivot post 100 which vertically extends from the surface of plate 50 at a location between bore 70 and axis "CL". The post has a transverse bore 102. A pivot bar 110 is pivotally mounted to the post 100. The pivot bar 110 defines an opening 112 adjacent one end. A bolt 114 extends transversely through the bar and through the bore 102 in the pivot post.

The pivot bar is shown having an intermediate enlarged section which defines a circular opening 120 which receives a throw-out bearing 153 which pivots on bolt 151. The right end of the bar 110, as viewed in FIGS. 2 and 3, defines a through-bore 125. A concave seat 126 extends concentrically around through-bore 125. A collar 130 is positioned on plate 50 aligned with the bore 125. Collar 130 is internally threaded at 132 and receives and is in threaded engagement with shaft 140. The upper end of shaft 140 is provided with a circular adjusting knob 145 having a projection 146 on its lower surface which engages concave seat 126. A vertical handle 148 projects from the upper surface of knob 145. It will thus be apparent that manual rotation of adjusting knob 145 in a direction to advance the adjusting knob with respect to pivot bar 110 will cause the feed bar to pivot downwardly about pivot point 102. The downward pivoting of the bar will advance the cutter.

The cutter body 160 is best seen in FIGS. 3, 5, 8 and 11 and includes a shank 150 which is engageable with the chuck of a power tool as described above. The shank 150 is secured to the driving side of a throw-out bearing 153 pivotally mounted to pivot bar at 151. Guide 155 is a cylindrical housing with an interior bronze bushing and is secured to plate 50 and provides a bearing surface in which body 160 rotates. The guide slidingly receives and pilots the advancement and retraction of head 160 which is advanced or retracted by pivot bar 110 which houses the throw-out bearing. Lubrication fitting 152 is provided in the housing 155.

As seen in FIGS. 4 and 5, the body 160 is generally cylindrical defining an interior bore 175 which extends a depth at least corresponding to the overall length of a Budd nut. The internal diameter of the bore closely corresponds to the diameter of Budd nut but is selected to provide a slight clearance. As seen in FIG. 5, a pair of diametrically opposed vertical slots 170 and 172 are provided at the lower edge of the cutting body. The slots receive cutting teeth 174 and 176, respectively. Each of the cutting teeth are made of a suitable material such as carbide and have a beveled cutting surface 177. The slots 170, 172 are positioned so that the inner vertical surfaces 178 of the cutting teeth are aligned with the flange of the Budd nut so that the teeth will cut the flange to a diameter to allow the inner wheel to pass over the remaining portion of the nut.

The cutting teeth 174, 176 are replaceable and are held in place in their respective slots by retainers 180, 182. The retainers as seen are generally U-shaped having a first leg 184 which abuts the cutting body and a spaced-apart leg 185 which engages the outer surface of the teeth. The retainers are held in place by screws 187 which are in threaded engagement with threaded bores 189 in the cutting body which bores are located below the slots 170, 172.

As best seen in FIGS. 3 and 6, a depth gauge 190 is also provided to assist the mechanic in correctly gauging the advancement of the cutter tool to a depth so as to cut only through the flange on the lug and not into the inner wheel. Accordingly, the depth gauge includes an elongate rod 192 slidable within bore 194 in plate 50. The rod 192 is positioned adjacent an edge of the bar 110 and is vertically positionable by loosening set screw 195. A depth gauge section 196 is provided at the upper end of the rod extending from the upper end of the rod to circumferential indicia 197. The distance from the end of the rod to indicia 197 is representative of the thickness of a conventional flange on a Budd nut. Thus, the depth gauge is set when the teeth of the cutter head first engage the upper surface of the flange by visually aligning the inner edge of the bar 110 with the upper end of the rod 192. The pivot bar 110 is then advanced until the upper surface of the bar is in registry with indicia 197 which indicates to the mechanic that the head has advanced through the flange on the nut and that the cutting operation should be terminated.

The present invention will be better understood from the following description of use for removing a broken Budd nut. The mechanic will initially install two inner nuts 30A, 30B in good condition on the wheel on either side of the damaged nut. This provides a mounting location for the tool 10. Next, the stand-offs 76 and 78 are positioned over the adjacent nuts 30A and 30B as seen in FIG. 3. The plate 50 is then aligned with the stand-offs so that the axial centerline "CL" aligns with the axis of the damaged nut 30. The mechanic then selects the proper nuts 80, 82, either right hand or left hand thread, as required. The nuts 80, 82 are then inserted through the holes 70, 72 in the plate and partially tightened by hand. Before further tightening the nuts, the mechanic will check to make sure the adjusting knob 145 is retracted sufficiently so that the cutter body turns freely without the cutting teeth engaging the retaining flange of the damaged nut 30 when nuts 80, 82 are tightened. Refer to FIG. 12.

The nuts 80, 82 are then tightened with the tightening tool 89 once the tool is properly positioned and aligned. The tightening tool is used to tighten nuts by engaging the tip 90 in the radial holes 88 of the nuts. When the lug nuts are tightened, the cutting body 160 should turn freely. If it does not turn freely, nuts 80, 82 will be loosened and plate 50 moved slightly so the cutting body turns freely once the nuts 80, 82 are tightened. FIGS. 10 and 11 illustrate the mounting of the tool to the wheel assembly.

Next, the drill 65 is secured by chuck 66 to the shank 150 of the cutting body. The chuck is tightened in conventional manner using a key. The body of the drill can then be turned counter-clockwise until the handle engages the stop bar 62. As is always good safety practice, the operator should protect his or her eyes by the use of safety glasses before the cutting operation is started. The drill may then be actuated and preferably the drill is a variable speed drill operated at a constant rpm of about 250 rpm by using a trigger lock 63 that is standard equipment on most drills. The pivot bar 110 is depressed until the cutters 174, 176 engage the flange 28 as seen in FIGS. 12 and 13. The depth gauge 190 can now be set.

The adjustment knob 145 may now be advanced by turning the handle 148 to rotate the knob in a clockwise direction. The teeth 174, 176 will make contact with the retaining flange 28 of the damaged nut. At this point, the mechanic proceeds slowly at a rate of no more than two full turns of the knob per minute. The operator should observe the cutting operation and the rate should be controlled so that chips of metal are continually discharged from the retaining flange of the damaged nut. If the feed rate is insufficient, chips will not be visible. An excessive feed rate will cause the power drill 65 to slow down resulting in possible breakage of the cutting tips. Lubrication of the cutting surface is recommended.

In the event the mechanic stops the rotation of the cutter tool to check the condition of the teeth, the adjustment knob should be retracted so that the cutting teeth are disengaged from the flange. Stopping the drill while the teeth are cutting will normally result in damage to the cutting teeth.

The cutting tool of the present invention may be fabricated from any suitable material. Preferably, all of the parts of the tool are aluminum except for nuts and bolts and the cutting teeth. Preferably the mounting nuts and the throw-out bearing guide are also fabricated of steel. Within the pivot bar 110 is a throw-out bearing such as bearing No. D-5, manufactured by Consolidated Precision Bearings.

Once the cutting operation is completed, the nuts 80, 82 are loosened and the tool removed. The stand-offs can then be removed from the adjacent Budd nuts. Since the collar or flange 28 of the seized nut has been cut away, it no longer obstructs removal of the truck wheel. Referring to FIGS. 12 and 13, once the wheel is removed, the remaining portion of the nut may be easily removed from the stud manually or by engagement with a suitable wrench or gripping tool such as a pliers or vice grips.

From the foregoing, it is apparent that the tool of the present invention is efficient and effective for removing seized or broken Budd nuts. The device provides a stable platform or base for the controlled advancement of the cutting teeth. While the tool has particular application to broken Budd nuts, it is obvious that the tool can be used in other installations where threaded fasteners are seized on a threaded member. The tool of the present invention may be operated even by unskilled mechanics with a minimum of instruction.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A tool for removing a seized or broken Budd nut from a wheel having a plurality of circumferentially arranged Budd nuts comprising:
   (a) a base plate;
   (b) mounting means for temporarily securing said base plate to at least one of said Budd nuts adjacent the broken Budd nut;
   (c) a cutter member having a cutting body;
   (d) power means for rotating said cutting body; and
   (e) a pivot bar pivotally mounted with respect to said base plate and attached to said cutter member for manually advancing and retracting said cutting body.

2. The tool of claim 1 wherein said mounting means includes stand-offs securable about the Budd nut immediately and oppositely adjacent the broken Budd nut and further including fasteners engageable with said adjacent Budd nuts for securing said plate at a position spaced from the surface of said wheel.

3. The tool of claim 1 further including adjusting means extending between said base plate and said pivot bar for selectively pivoting said pivot bar to advance and retract said cutting body.

4. The tool of claim 1 wherein said cutting body defines a bore and includes carbide teeth oppositely positioned on said body.

5. The tool of claim 4 wherein said carbide teeth are replaceably secured to said body.

6. The tool of claim 1 further including depth gauge means which may be manually set to assist the mechanic in determining the position of said cutting body.

7. A tool for removing a seized or broken Budd nut engaged on a threaded stud of a dual wheel assembly in which the Budd nut and stud extend through a bore in an inner wheel, said tool comprising:
   (a) a base plate having a pair of spaced-apart bores alignable with the Budd nuts immediately opposite and adjacent the broken Budd nut;
   (b) a pair of stand-offs positionable over the adjacent Budd nuts;
   (c) fasteners engageable with said stand-offs to secure said base plate in a mounting position spaced from the surface of the inner wheel;
   (d) cutter means including a cutter body within a bearing on a pivot bar reciprocably mounted with respect to said base plate, said cutter body including a bore for receiving the broken Budd nut and having cutting teeth generally aligned with the flange on the broken Budd nut, said cutter body being adapted to be placed in driven engagement with a power tool.

8. The tool of claim 7 further including a stop bar and wherein said power tool comprises a power drill and wherein said stop bar is positioned to engage the power drill to prevent rotation of the power drill to free the hand of a mechanic.

9. The tool of claim 7 wherein said pivot bar is pivotally mounted with respect to said base plate and including adjustment means in threaded engagement with the base plate for pivoting said pivot bar.

10. The tool of claim 7 further including depth gauge means on said base plate for gauging the depth of the cut made by the cutting teeth in relation to the depth of the flange on the Budd nut.

11. The tool of claim 7 wherein said fasteners are right hand threaded nuts.

12. The tool of claim 7 wherein said fasteners are left hand threaded nuts.

13. The tool of claim 7 wherein said cutting teeth are replaceably secured to said cutting body.

14. The tool of claim 7 wherein said cutter means include a throw-out bearing.

15. The tool of claim 7 wherein said base plate is configured to provide clearance around the hub of a wheel assembly.

16. The tool of claim 7 wherein said cutting body rotates in a bronze bushing.

* * * * *